United States Patent
Kidron et al.

(10) Patent No.: US 10,038,771 B2
(45) Date of Patent: Jul. 31, 2018

(54) EXTENDING FEATURES OF ONE DEVICE TO ANOTHER

(71) Applicant: HEWLETT PACKARD ENTERPRISE DEVELOPMENT LP, Houston, TX (US)

(72) Inventors: Adi Kidron, Yehud (IL); Eitan Katz, Yehud (IL); Tomer Priel, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 23 days.

(21) Appl. No.: 15/128,175

(22) PCT Filed: Apr. 30, 2014

(86) PCT No.: PCT/US2014/036076
§ 371 (c)(1),
(2) Date: Sep. 22, 2016

(87) PCT Pub. No.: WO2015/167504
PCT Pub. Date: Nov. 5, 2015

(65) Prior Publication Data
US 2017/0111494 A1    Apr. 20, 2017

(51) Int. Cl.
*H04B 7/00* (2006.01)
*H04M 1/725* (2006.01)
*H04L 29/08* (2006.01)
*H04W 76/02* (2009.01)
*H04W 76/10* (2018.01)

(52) U.S. Cl.
CPC ........ *H04M 1/72527* (2013.01); *H04L 67/16* (2013.01); *H04W 76/02* (2013.01); *H04W 76/10* (2018.02)

(58) Field of Classification Search
CPC .... H04L 67/16; H04M 1/72527; H04W 76/02
USPC ........................................................ 455/41.3
See application file for complete search history.

(56) References Cited

U.S. PATENT DOCUMENTS

| | | | |
|---|---|---|---|
| 6,032,043 A * | 2/2000 | Houde | H04Q 3/0041 455/432.3 |
| 8,688,765 B2 * | 4/2014 | Martin | G06F 9/465 707/769 |
| 8,706,588 B1 | 4/2014 | Zhu | |
| 2009/0003281 A1 | 1/2009 | Panabaker | |

(Continued)

FOREIGN PATENT DOCUMENTS

| EP | 2615801 | 7/2013 |
|---|---|---|
| WO | WO2010091312 | 8/2010 |

OTHER PUBLICATIONS

International Search Report and Written Opinion dated Jan. 15, 2015, PCT Patent Application No. PCT/US2014/036076 dated Apr. 30, 2014, Korean Intellectual Property Office, 12 pages.

(Continued)

*Primary Examiner* — Eugene Yun (57) ABSTRACT

Extending a feature includes receiving a feature extension request from a first device identifying a feature not natively available to the first device. From a pool of registered devices, a second device offering the requested feature is identified. A communication link via which the requested feature can be extended to the first device is initiated. The extending of the requested feature from the second device to the first device is facilitated.

12 Claims, 5 Drawing Sheets

(56) References Cited

U.S. PATENT DOCUMENTS

2011/0225553 A1    9/2011   Abramson et al.
2013/0311984 A1   11/2013   Kalwar
2014/0067903 A1    3/2014   Saeteras et al.
2014/0112211 A1    4/2014   Walters

OTHER PUBLICATIONS

MOOR Insights & Strategy, 45 Days with the Motorola Atrix Lapdock, Apr. 16, 2011, 6 pages, found online at: http://www.moorinsightsstrategy.com/45-days-with-the-motorola-atrix-lapdock/.

* cited by examiner

EXTENDING FEATURES OF ONE DEVICE TO ANOTHER

CROSS-REFERENCE TO RELATED APPLICATION

This application is a U.S. National Stage Application of and claims priority to International Patent Application No. PCT/US2014/036076, filed on Apr. 30, 2014, and entitled "EXTENDING FEATURES OF ONE DEVICE TO ANOTHER", the entire contents of which are hereby incorporated in its entirety.

BACKGROUND

As the internet more and more ubiquitous. Many devices we rely on for entertainment and work include data communication features. Such features may be enabled via any of a number of protocols including Wi-Fi, Ethernet, Bluetooth, and NFC (Near Field Communication). Via their respective data communication features the functionality of these devices can be enhanced. As examples, audio and visual devices can stream content while appliances and automobiles can report diagnostic data.

DETAILED DESCRIPTION

Introduction: The cost of enabling data communication continues to drop, and the demand for an interconnected environment of devices is increasing. Thus, more and more devices are being equipped with data communication capabilities. Plainly, such devices include mobile phones, tablets, the like. Other devices being so equipped include thermostats and other environmental sensors and controls, lighting, automobiles, televisions, stereos, and other household appliances.

The functionality that a data communication capability can provide for a given device is limited by the device's hardware and programming restrictions. For example, an appliance may be able to report diagnostic data, but without a GPS or other location device, it may not be able to include location information. Without a camera, that same appliance cannot capture an image of its current environment. The owner of that appliance may own a smartphone possessing the features missing from the appliance needed to enhance its existing data communication capabilities.

Various embodiments describe below are directed to a system or platform for registering devices and their features. Through the system, a feature of one device can be requested and extended for use by another device. The term feature, as used herein, means a capability offered by a device. That capability may be a specialized hardware enabled function or a software enabled service. Examples of hardware enabled functions include audio and video capture, audio broadcast, visual display, location detection, storage, additional computing processing ability, as well as varying data exchanging interfaces including Bluetooth, NFC, Ethernet, and Wi-Fi. Examples of software enabled services include remote content storage, installed applications, as well as varying messaging protocols such as email, SMS and the like.

As an example, a user gray own a smartphone, a kitchen appliance, and a television each with data communication capabilities registered with the system. At the kitchen appliance's request, the touch screen display capabilities of the user's phone may be extended to and made available to the kitchen appliance. In this way, the appliance can communicate information to and receive instructions from the user. At the television's request, an identity service available through the smartphone may be extended to the television, allowing the television to access restricted content.

Figure 1:
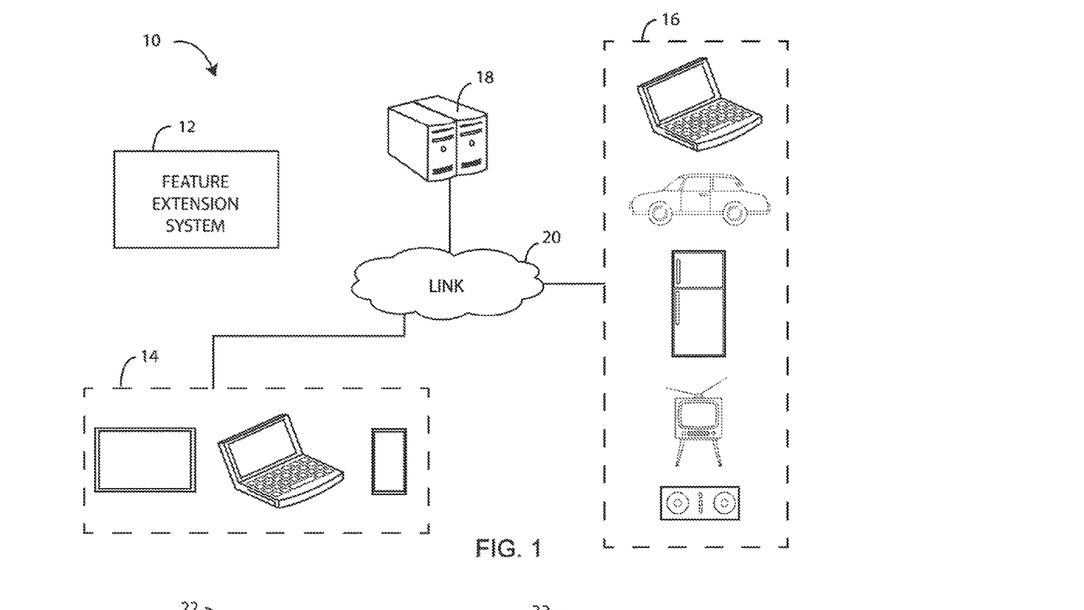
FIG. 1 is a block diagram depicting an example environment in which various embodiments may be implemented.

Components FIG. 1 depicts an example environment 10 in which embodiments may be implemented as feature extension system 12. In addition to system 12, environment 10 is shown to include user devices 14 and 16 and server device 18. User devices 14 are intended to represent devices whose features are registered with system 12 and can be extended. User devices 16 are intended to represent devices to which those features may be extended. That said, user devices 16 may also include features registered with system 16 capable of being extended for use by other devices including user devices 14. In the example of FIG. 1, user devices 14 are depicted as a tablet, notebook computer, and a smartphone. User devices 16 are depicted as a notebook computer an automobile, a refrigerator, a television, and a stereo.

Server device 18 represents computing devices capable of implementing feature extension system 12. Server device is capable of interaction with user devices 14 and 16 via link 20. Link 20 represents generally any infrastructure or combination of infrastructures, wired and wireless, configured to enable electronic data communication between components 14, 16 and 18. For example, link 20 may represent the internet, one or more intranets, and any intermediate routers, switches, and other interfaces. Link 20 may also represent generally components of user device 14 and 16 that enable direct communication between any two of user devices 14 and 16. Examples include Wi-Fi, Bluetooth and NFC radios.

System 12, discussed in more detail below, represents a combination of hardware and programming configured to implement the extension of features between devices 14 and 16. More specifically, system 12 is responsible for maintaining a registry of devices and their features including security data limiting access to device features Such limits may include feature blocking as well as feature restrictions that constrain how a given feature is to be extended. For example, the security data might block a feature from being extended with the exception of a whitelist. Security data may constrain a feature such as a camera such that it can only be extended to another device at a limited resolution. System 12 is also responsible for receiving requests from a device for a type of feature. Using its registry and security data, system 12 identifies, if available, a device having a requested feature and initiates the extension of that feature to the requesting device.

Figure 2:
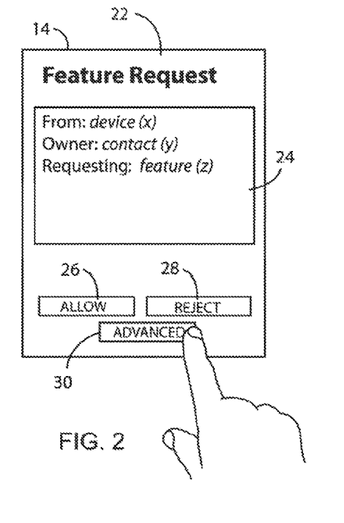
FIGS. 2 and 3 depict example screen views of user interfaces for interacting with a feature extension system.
Figure 3:
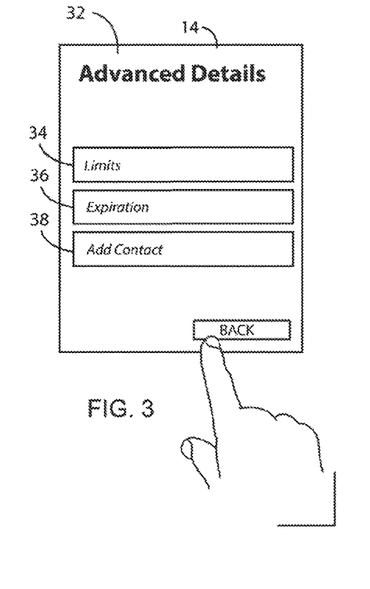

FIGS. 2 and 3 are screen views depicting an example of user interaction with system 12 of FIG. 1. FIG. 2 depicts a user interface of a device 14 for which a feature has been requested. An application operating on device 14 received the request from system 12 and in response caused a feature request prompt to be displayed as interface 22. Interface 22 includes content 24 describing details of the request such as the requesting device and the device's owner. Interface 22 also includes controls 26, 28, and 30 for responding to the request. In this example, the user can allow the request via control 26, reject the request via control 28, or access advanced details via control 30.

Presuming the user has selected to view advanced details, user the application operating on device 14 causes interface 32 to be displayed. Here, via controls 34, the user can specify limits for the extension of the requested feature. A feature offered by a device such as device 14 has a finite set of capabilities. A limit specifies which subset of those capabilities are to be extended. For example, a camera feature may be capable of capturing images at multiple resolutions. A knit for that feature may specify a subset of those resolutions. An application feature may have access to multiple data stores, music and video libraries for example. A limit for that feature may specify a subset of those data stores. The specified limit may be associated with the feature itself, to the device requesting extension of the feature or to an owner associated with that requesting device.

Via control 36, the user might add an expiration with respect to the granting of a feature extension request. That expiration may apply to the extension of the feature itself, to the device requesting extension of the feature, or to an owner associated with that requesting device. Via control 38, the user can add the requesting device or its associated user as a contact. In doing so, the requesting device or its owner may be added to a black list preventing the feature from being extended now an in the future or to a white list allowing the future extension requests for that feature to be automatically granted for the requesting device.

Figure 4:
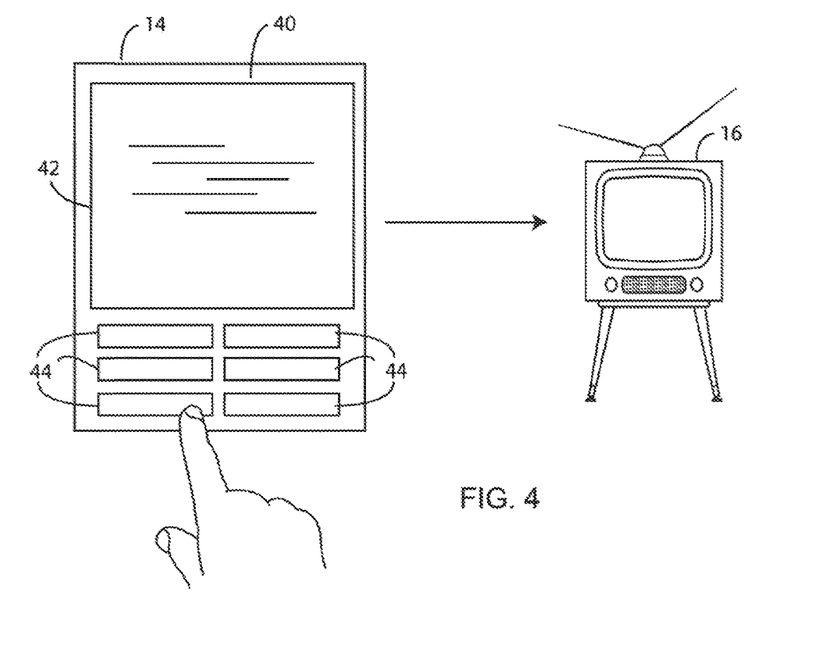
FIG. 4 depicts an example in which feature of a computing device has been extended to a television.
Figure 5:
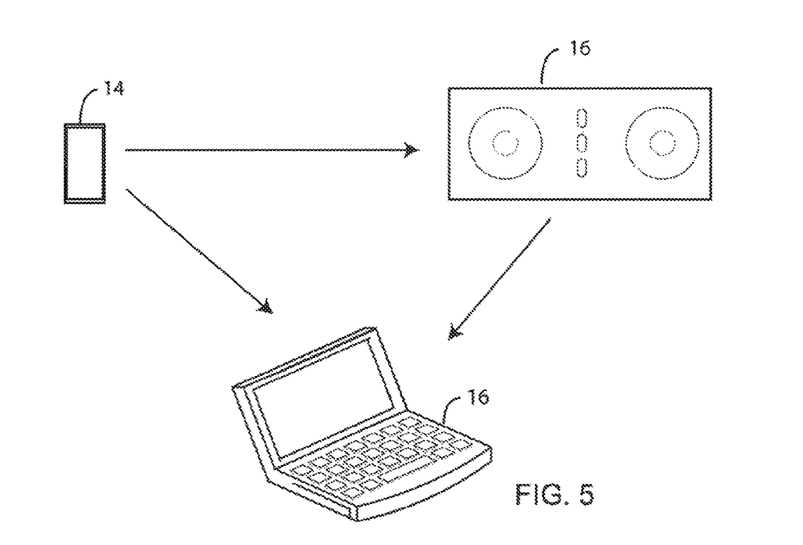
FIG. 5 depicts an example in which features of a smart phone have been extended to an audio device and to a laptop computer and in which a feature of the audio device has been extended to the laptop computer.

FIGS. 4 and 5 depict examples of features being extended from one device to another with the aid of system 12. In FIG. 4, requesting device 16 is a television that has requested access to the touch enabled display of a tablet computing device 14. Here, device 14 is extending that feature and requesting device 16 is causing a display of an interface 40 that includes secondary content with respect to a program it is currently displaying. Secondary content may, for example, include an alternate view or a replay of a live presentation such as a sporting event. Content 42 may include a live conversation or comment feed. Controls 44, in this example, may allow the user to manipulate content 42 or interact with requesting device 16.

In FIG. 5, notebook computer 16 is requesting features of smart phone 14 and audio device 16 be extended for its use. Audio device 16 requesting that a feature of smart phone 14 be extended for its use. In this example, a camera or a location feature of smart phone be extended for use by notebook computer 16. Audio output features of audio device may be extended for use by notebook computer 22. Further, a touch screen display of smart phone 4 may be extended to audio device 16 via which a user may approve the extension request of the audio features to notebook computer 22.

Figure 6:
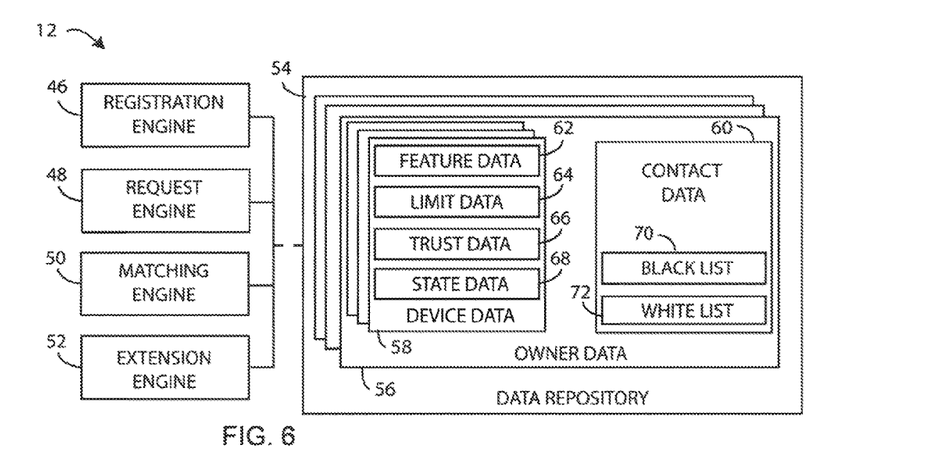
FIG. 6 is a block diagram depicting an example of a feature extension system.
Figure 7:
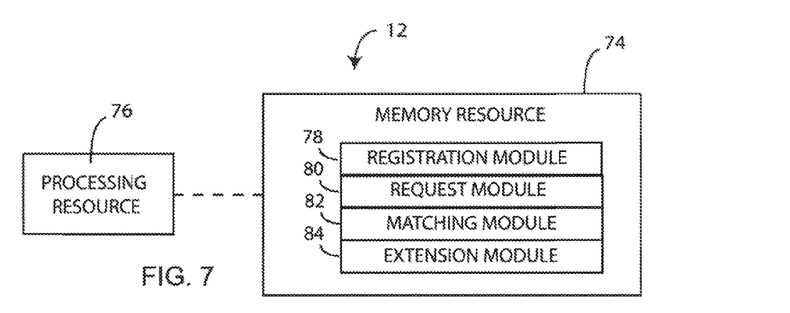
FIG. 7 is a block diagram depicting a memory resource and a processing resource according to an example.

FIGS. 6-7 depict examples of physical and logical components for implementing feature extension system 12. In FIG. 4 various components are identified as engines 46-52. In describing engines 46-52, focus is on each engine's designated function However, the term engine, as used herein, refers to a combination of hardware and programming configured to perform a designated function. As is illustrated later with respect to FIG. 5, the hardware of each engine includes one or both of a processor and a memory device, while the programming is code stored on that memory device and executable by the processor to perform the designated function.

FIG. 4 is a block diagram depicting components of feature extension system 12. In this example, system 12 includes registration engine 46, request engine 48, matching engine 50, and extension engine 52. In performing their respective functions, engines 46-52 may access data repository 54. Repository 54 represents generally any memory accessible to system 12 to which data can be stored and from which data can be retrieved.

Registration engine 46 is configured to maintain a registry of features offered for extension by a pool of devices. The pool may represent devices owned by any number of users. An example of such a registry is depicted as sets or owner data 56 in data repository 54. Each set of owner data 56 is shown to include sets of device data 58 for any number of registered devices of that owner. Each owner data set is also shown to include contact data 60 used to reflect relationships between the owner and others.

Each set of device data 58 is shown to include feature data 62, limit data 64, trust data 66, and state data 68. Feature data 62 represents information identifying the feature or features that the given device is offering to extend as well as capabilities of each offered feature. Such represents compatibility data. For each feature offered, feature data 62 may identify a feature type for use in categorizing. Limit data 64 represents data for use in limiting the extension of a feature. As previously explained, a feature has a finite set of capabilities. Limit data 64 specifies for features identified in feature data 62 which subset of each feature's capabilities are to be extended.

Trust data 66 represents information needed to access or utilize a feature identified in feature data 62. Trust data 66 can include credentials needed to access the feature. For example, the device offering the feature may require authentication and authorization of any or all of system 12, the requesting device, and the owner of the requesting device, before extending a given feature. Trust data 66 may include credentials needed for such authentication and authorization. State data 68 represents information concerning a state of a device offing a feature to be extended. Such may include information reported by the given device such as location, its current operational status, its user's identification. As described below, the state data can be used to select from a number of devices that might be offering to extend a requested feature.

Contact data is shown to include a black list 70 and a white list. Typically, one or the other is active. However, with respect to a given device, a black list may be active for one or more features identified in feature data 62 while white list 72 may be active for a different feature or features. The black list identifies those users and devices not authorized to utilize a feature offered for extension. The white list 72 identifies a user or a device that is authorized to utilize a feature offered for extension by a device. Devices or user's not identified on the while list car not authorized. Limit data 64, trust data 66, and contact data 60 is collectively and independently referred to as security data.

Request engine 48 is configured to receive a request to extend a feature to a requesting device. As explained, a feature is a capability offered by a device. That capability may be a specialized hardware enabled function or a software enabled service. The requested feature may not be natively available to the requesting device. In other words, the requesting device may not have the hardware or software to enable the requested feature. Request engine 48 may receive requests directly from a user of the requesting device. For example, through software executing on the requesting device, the user may cause a request to be communicated to system 12 and request engine 48. Request engine 48 may also infer a user request based on state data 68 for a given device offering a feature for extension. For example, a request may be deemed with the device offering the feature is in proximity of the requesting device or when the device offering the feature is in a specified operational state such as being idle, having a fully charged battery, or having Bluetooth capabilities activated. Again, a device offering features may periodically report such data allowing registration engine to record it as state data 68.

Matching engine 50 is configured to, in response to a feature extension request received by request engine 48, select, from a registry maintained by registration engine 46, a device from the registry's pool that is offering the requested feature. The request itself may specify the device, in which case matching engine 50 may attempt to select that device. Where it does not, matching engine 50 can access data repository 54 and search feature data 62 of sets of device data 58 for a device offering the requested feature based on that compatibility data. That search may be limited to the set of owner data 56 associated with the user or it may span multiple sets of owner data 56.

When selecting a device that offers the requested feature, request engine 50 may do so contextually. In other words, a current state of a device offering the requested feature may affect whether or not the device is selected. For example, usability of the requested feature may be impacted by a proximity of the device requesting the feature to the device offering to extend the requested feature. Usability may be impacted by a current operational state of the device offering to extend the requested feature. Usability may also be affected by which individual user is currently accessing the device offering to extend the requested feature. In performing its function, matching engine 50 may identify a type of feature requested and a context rule associated with that type. A context rule is a rule that can be satisfied to varying degrees based on a state of a device offering a feature of a given type.

Here, matching engine 50 may then access state data for each device identified to offer a requested feature and then process that state data for each device against that context rule to determine a preference raking for each of those identified devices. A preference score is an indication as to what degree the rule was satisfied based on the state data for a given device. Matching engine 50 can then attempt to select the device determined to have the best preference ranking.

Matching engine 50 can attempt to select a device based on security data associated with that device. The security data can include a white list 72, a black list 70, and trust data 66. If the requesting device or user is included on the black list the attempt fails, and matching device 50 may make an attempt to select the device having the next best preference ranking. If the requesting device is on the white list 72 and the trust data 66 is valid the selection attempt is successful. If the requesting device is not whitelisted or the trust data 66 is not valid, matching engine 50 may communicate with the device offering the requested service causing that device to display a prompt such as the prompt depicted in FIGS. 2 and 3. A user response entered through the prompt can cause the attempt to succeed or fail.

Extension engine 52 is configured to initiate a communication link via which the feature identified by a feature extension request can be extended. That communication link may be an indirect communication link that extends between the requesting device and system 12 and between system 12 and the selected device offering to extend the feature. Here, extension engine 52 is responsible for extending the identified feature via that indirect communication link. In doing so, extension engine 50 may intercept or otherwise receive calls for the feature from the requesting device, translate, if needed, those calls into a format compatible with the selected device, and pass the calls, translated or otherwise, to the selected device. Extension engine 50 may intercept or otherwise receive responses to the calls from the selected device, translate the responses, if needed, to a format compatible with the requesting device, and communicate the responses, translated or otherwise, to the requesting device.

In some cases it may be possible to extend a feature via a direct communication link between the requesting device and a selected device offering to extend the requested feature. Examples of direct communication links include peer to peer Ethernet links, peer to peer Wi-Fi links, Bluetooth links, and NFC links. Here, the requesting device and the selected device offering to extend the requested feature can utilize shared feature extension data to establish the direct communication link. Feature extension data can include credentials such a user names, passwords, and PINs and link identifiers such as SSIDs and Bluetooth IDs which may be stored in trust data 66. Extension engine 50, via an initiated indirect communication link between the devices can facilitate the extending of the feature by passing the feature extension data to the devices with instructions to establish a corresponding direct communication link and extending the feature from the selected device offering to extend the feature to the requesting device.

In facilitating the extension of a feature, extension engine may identify a limit associated with the feature. The limit may correspond to the device offering to extend the feature, it may correspond to the device requesting the feature, or it may correspond with the identity of a user of the requesting device. As noted, a feature can include a finite set of capabilities. A limit in this case specifies a subset of those capabilities. When the feature is extended via an indirect communication link, extension engine 52 may function to block calls to capabilities not included in the limit. Where the feature is extended via a direct communication link, the feature extension data can include data specifying the limit. The device offering the requested feature can block calls for capabilities outside the limit or otherwise enforce the limit.

In the foregoing discussion, engines 46-52 were described as combinations of hardware and programming. Engines 46-52 may be implemented in a number of fashions. Looking at FIG. 7, the programming may be processor executable instructions stored on tangible memory resource 74 and the hardware may include processing resource 76 for executing those instructions. Thus memory resource 74 can be said to store program instructions that when executed by processing resource 76 implements system 12 of FIG. 6.

Memory resource 74 represents generally any number of memory components capable of storing instructions that can be executed by processing resource 76. Memory resource 74 is non-transitory in the sense that it does not encompass a transitory signal but instead is made up of one or more memory components configured to store the relevant instructions. Memory resource 74 may be implemented in a single device or distributed across devices. Likewise, processing resource 76 represents any number of processors and supporting hardware capable of executing instructions stored by memory resource 74. Processing resource 76 may be integrated in a single device or distributed across devices. Further, memory resource 74 may be fully or partially integrated in the same device as processing resource 76, or it may be separate but accessible to that device and processing resource 76.

In one example, the program instructions can be part of an installation package that when installed can be executed by processing resource 76 to implement system 12. In this case, memory resource 80 may be a portable medium such as a CD, DVD, or flash drive or a memory maintained by a server from which the installation package can be downloaded and installed. In another example, the program instructions may be part of an application or applications already installed. Here, memory resource 74 can include integrated memory such as a hard drive, solid state drive, or the like.

In FIG. 7, the executable program instructions stored in memory resource 74 are depicted as registration, request, matching, and extension modules 78-84 respectively. Registration module 78, request module 80, matching module 82, and extension module 84 represent program instructions that, when executed, cause processing resource 76 to implement registration engine 46, request engine 48, matching engine 50, and extension engine 52 respectively.

Figure 8:
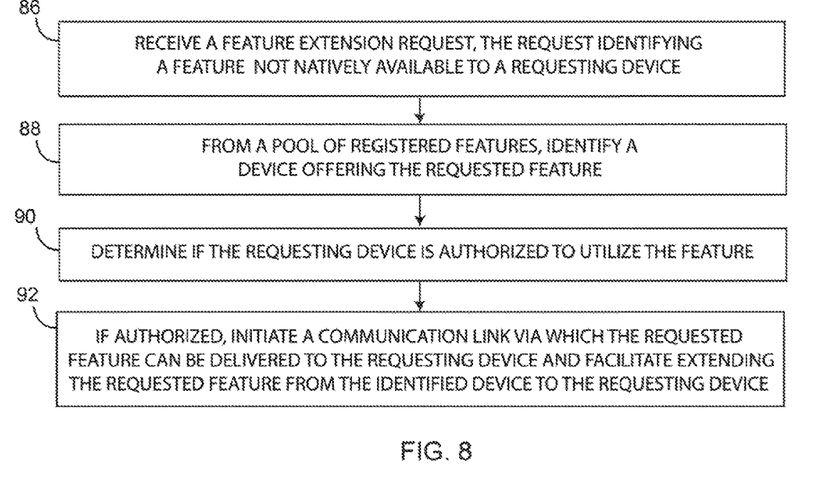
FIGS. 8-12 are flow diagram depicting actions taken to implement examples.

Operations: FIG. 8 is a flow diagram of actions taken to implement a method for extending a feature from one device to another. FIGS. 9-12 expand with more detailed examples of various blocks of FIG. 8. In discussing FIGS. 8-11 reference may be made directly or indirectly to components depicted in FIGS. 1-7. Such reference is made to provide contextual examples and not to limit the manner in which the method depicted by FIGS. 8-11 may be implemented.

A feature extension request is received from a first device (block 86). The request identifies a feature that is not natively available to the first device. The first device here may be referred to as the requesting device. Referring to FIG. 5, request engine 48 may be responsible for block 86. The request may be initiated by a user interacting with the first device. Alternatively, the request may be initiated based on a current state of the first device. The state may correspond to its location, operational status, as well as the identity of its current user.

From a pool of registered devices, a second, available device offering the requested feature is identified (block 88). Referring to FIG. 6, matching engine 50 may be responsible for block 88. Block 88 may be accomplished by accessing a registry of features and their corresponding devices such as owner data sets 56 of FIG. 6. That registry can identify a plurality of features and the devices offering to extend those features. From that registry, a match can be found. A device is deemed available if it is currently accessible meaning that it is powered on and in a mode allowing extension of the feature. The mode may be reflected by its operational state as well as an identity of a current user of the device. The availability of a device can, with respect to FIG. 6, be determined based on state data 68 reported by that device to system 12.

It is determined if the first device, that is the requesting device, is authorized to utilize the identified feature (block 90). Referring to FIG. 6, matching engine 50 may be responsible for block 90. Block 90 may be accomplished by accessing security data associated with any of the second device, the first device, and a user of the first device. The security data may, in the example of FIG. 6, include any of a white list 72, a black list 70 and trust data 66. Presuming authorization in block 90, a communication link is established via which the requested feature can be extended from the and device to the first and the extending of the feature is facilitated (block 92).

Figure 9:
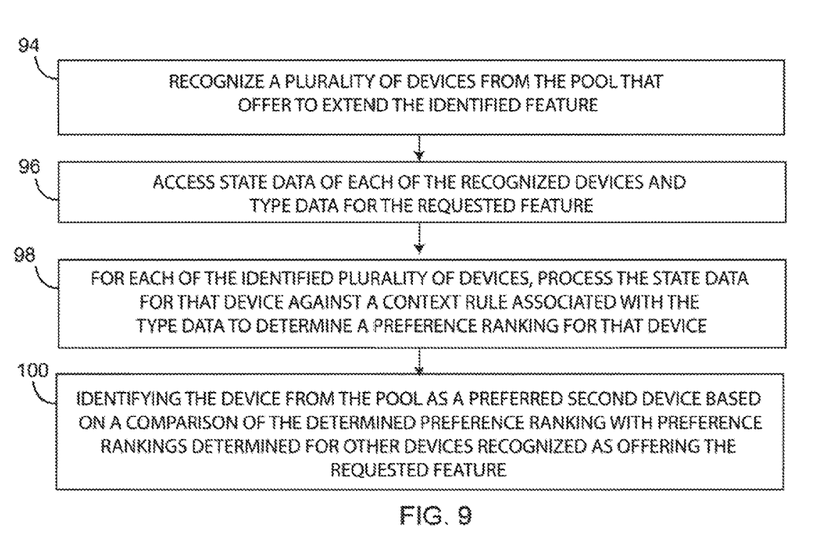
Figure 10:
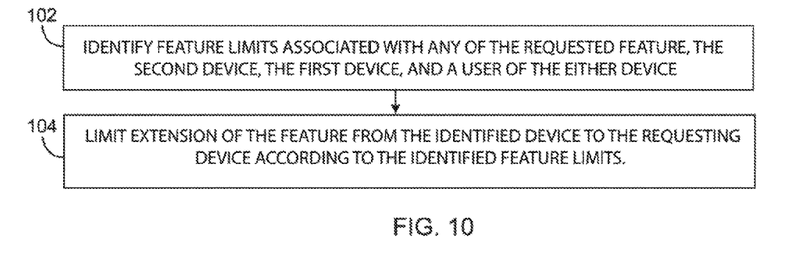

Block 88 may include identifying a plurality of second devices offering the requested feature. FIG. 9 expands on block 88. A plurality of devices offering the requested feature are identified from the pool of registered features (block 94). State data for each of the recognized devices and type data for the requested feature are accessed (block 96). For each of the identified plurality of devices, the state data for that device is processed against a context rule associated with the type data (block 98). Based on a comparison of the preference rankings, the second device is identified as a preferred second device for use in block 92 of FIG. 8.

As described earlier, limits may be specified with respect to extending the requested feature. Addressing such limits, FIG. 10 expands on block 92 of FIG. 8. Limits associated with any of the requested feature, the first device, the second device, and users of the first and second devices are identified (block 102). The extension of the feature from the device identified in block 88 is limited according to the identified feature limits (block 104). Referring to FIG. 6, blocks 102 and 104 may be implemented by extension engine 52 with the use of limit data 64. Block 104 may be accomplished blocking or instructing the blocking of calls to a requested feature that are outside the limit.

The feature requested in block 86 may, in block 92, be extended via an indirect link or a direct communication link. In either case, facilitating the extension involves the indirect communication link. An indirect communication link, as specified above, is link between the requesting device and the divide identified in block 88 that passes through and relies on device extension system 12 or some other service that facilitates communication between those devices. A direct communication link a link that does not require the aid of a third party device or service once established such as a Bluetooth Link or a peer to peer Wi-Fi link.

Figure 11:
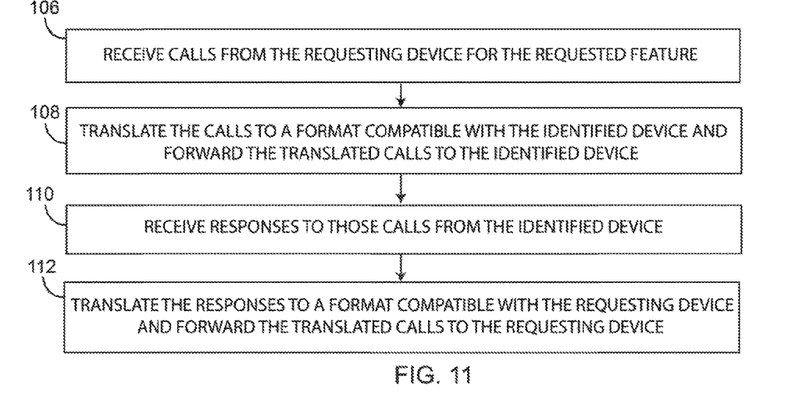

FIG. 11 expands on block 92 of FIG. 8 in the case where the requested feature is extended via an indirect communication link. Calls from the requesting device for the feature requested in block 86 are received (block 106). Those calls are translated to a format compatible with the device identified in block 88 and forwarded to the identified device (block 108). Responses to those calls are received from the identified device (block 110). The responses are translated to a format compatible with the requesting device and forwarded on to the requesting device (block 112). Referring to FIG. 6, the translating may be accomplished by extension engine 52 using drivers compatible with the feature being extended, the identified device, and the requesting device.

Figure 12:
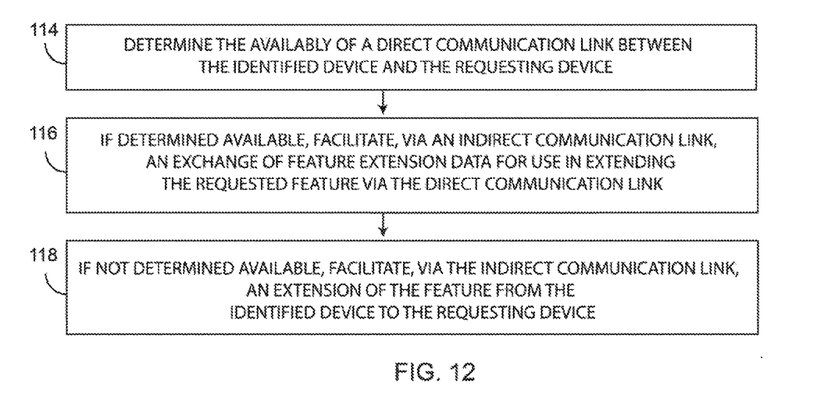

FIG. 12 expands on block 92 of FIG. 8 in the case where the requested feature is may be selectively extended via an indirect communication link or a direct communication link. The availability of a direct communication link between the requesting device and the device identified in block 88 is determined (block 114). If determined available, an exchange of feature extension data is facilitated via an indirect communication link for use by the identified device to establish the direct communication link and to extend the requested feature to the requesting device via that direct communication link (block 116). If a direct communication link is not available, an extension of the requested feature is facilitated via the indirect communication link (block 118).

Conclusion: FIG. 1 depicts an example environment in which embodiment may be implemented. Implementation is not limited to the example of FIG. 1. FIGS. 2 and 3 depict example screen views of user interfaces for interacting with a feature extension system. The design of the user interfaces is intended only as an example. FIGS. 6-7 aid in depicting the architecture, functionality, and operation of various embodiments. In particular, FIGS. 6-7 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, a random access memory (RAM), read-only memory (ROM), erasable programmable read-only memory, flash drives, and portable compact discs.

Although the flow diagrams of FIGS. 8-12 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in following claims.

What is claimed is:

1. A method for extending a feature to a first device, the method comprising:
   receiving a feature extension request from the first device identifying and requesting a feature not natively available to the first device;
   from a pool of registered devices, identifying a second device offering the requested feature;
   accessing state data of the second device and type data for the requested feature;
   processing the state data against a context rule associated with the type data to determine a preference ranking for the second device; and
   based on the preference ranking for the second device, initiating a communication link via which the requested feature can be extended to the first device and facilitating extending the requested feature from the second device to the first device.

2. The method of claim 1, wherein identifying further comprises:
   for each of a plurality of devices in the pool offering the identified feature, performing the accessing and processing of the state data, and determining a preference ranking based on the accessing and processing; and
   identifying one of the plurality of devices as the second device based on a comparison of the preference rankings determined for the plurality of devices.

3. The method of claim 1, wherein identifying comprises determining whether the the first device is authorized to utilize the requested feature from the second device, wherein authorization is determined according to at least one of:
   security data associated with the second device; and
   a user response entered via the second device in response to a prompt informing the user of the request.

4. The method of claim 1, wherein facilitating comprises:
   identifying a feature limit associated with at least one of the requested feature, the first device, and the second device; and
   limiting the extending of the requested feature according to the feature limit.

5. The method of claim 1, wherein initiating comprises initiating an indirect communication link and facilitating comprises, via the indirect communication link:
   receiving calls for the requested feature from the first device, translating the calls into first format compatible with the second device and forwarding the translated calls to the second device; and
   receiving, from the second device, responses to the forwarded calls, translating the responses to a second format compatible with the first device, and forwarding the responses to the first device.

6. The method of claim 1, wherein initiating comprises initiating an indirect communication link and facilitating comprises, via the indirect communication link, facilitating an exchange of feature extension data for use in extending the feature via a direct communication link between the first and second devices.

7. A memory resource storing instructions that when executed cause a processing resource to implement a system for extending a device feature, the instructions comprising:
   a registration module including instructions to cause the processing resource to maintain a registry of features offered for extension from a pool of devices, the registry including compatibility data for each offered feature;
   a request module including instructions to cause the processing resource to receive a feature extension request specifying a feature to be extended to a requesting device;
   a matching module including instructions to cause the processing resource to select, from the registry and based on the compatibility data, a device from the pool offering a feature compatible with the extension request, wherein the matching module instructions further cause the processing resource to:
      examine the registry to recognize a plurality of devices from the pool that each offers the specified feature;
      access state data for each of the plurality of devices; and
      select, based on the accessed state data, one of the plurality of devices from which the specified feature is to be extended;

an extension module including instructions to cause the processing resource to initiate a communication link via which the requested feature can be extended and facilitate extending the requested feature from the selected device to the requesting device via the initiated communication link.

8. The memory resource of claim 7, wherein:

the registry includes, for each of the plurality of devices in the pool, security data including data for use in limiting the extension of featured offered by that device; and the instructions to select one of the plurality of devices comprise instructions to determine whether the requested device is authorized to utilize the requested feature from the selected device, wherein authorization is determined according to at least one of, security data associated with the selected device and a user response entered via the selected device in response to a prompt informing the user of the request.

9. The memory resource of claim 7, wherein the extension module includes instructions to cause the processing resource to selectively:

initiate an indirect communication link and facilitate extending the requested feature from the selected device to the requesting device via the indirect communication link; and initiate an indirect communication link and facilitate extending by facilitating an exchange of feature extension data for use in establishing a direct communication link between the selected device and the requesting device via which the selected device can extend the specified feature to the requesting device.

10. A system for extending a device feature, comprising:

a registration engine to maintain a registry of features offered for extension from a pool of devices, the registry including compatibility data and security data for each offered feature, the offered features being categorized by feature type and the registry including context rules, each associated with a given feature type;

a matching engine to, in response to a feature extension request, identify a plurality of devices from the pool that offer a feature compatible with the feature extension request access state data for each of the identified plurality of devices;

for each of the identified plurality of devices, process the state data accessed for that device against a context rule associated with a feature type for the requested feature to determine a preference ranking for that device; and select from the registry a device from the pool offering a feature compatible with the feature extension request based on a comparison of the preference rankings determined for the identified plurality of devices and the compatibility data, and for which the requesting device is authorized to utilize based on the security data; and an extension engine to initiate a communication link via which a feature identified by the feature extension request can be extended and facilitate extending the requested feature from the selected device to the requesting device via the initiated communication link.

11. The system of claim 10, wherein:

the registration engine is to maintain a registry of features offered for extension from a pool of devices, the registry including limit data for the selected device; and the extension engine is to facilitate extending the requested feature from the selected device to the requesting device limited according to the limit data such that less than the full capability of the requested feature is extended to the requesting device.

12. The system of claim 10, wherein the extension engine is to selectively:

initiate an indirect communication link and facilitate extending the requested feature from the selected device to the requesting device via the indirect communication link; and initiate an indirect communication link and facilitate extending by facilitating an exchange of feature extension data for use in establishing a direct communication link between the selected device and the requesting device via which the selected device can extend the requested feature to the requesting device.

* * * * *